United States Patent
Ding et al.

(10) Patent No.: US 6,480,641 B1
(45) Date of Patent: Nov. 12, 2002

(54) METHOD AND APPARATUS FOR OPTICALLY MODULATING LIGHT THROUGH THE BACK SIDE OF AN INTEGRATED CIRCUIT DIE ALONG THE SIDE WALLS OF JUNCTIONS

(75) Inventors: Yi Ding; Mario J. Paniccia, both of Santa Clara; Timothy J. Maloney, Palo Alto, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/434,866

(22) Filed: Nov. 4, 1999

Related U.S. Application Data

(63) Continuation-in-part of application No. 08/993,786, filed on Dec. 19, 1997, now Pat. No. 6,075,908.

(51) Int. Cl.$^7$ .............................. G02B 6/12; G02F 1/015
(52) U.S. Cl. ........................ 385/14; 359/248; 359/263
(58) Field of Search ........... 385/14, 1–3; 359/245–248, 359/263; 324/752

(56) References Cited

U.S. PATENT DOCUMENTS

| | | | | |
|---|---|---|---|---|
| 4,758,092 A | * | 7/1988 | Heinrich et al. | |
| 4,958,898 A | * | 9/1990 | Friedman et al. | |
| 5,040,859 A | * | 8/1991 | White | 359/276 |
| 5,872,360 A | * | 2/1999 | Paniccia et al. | 250/341.4 |
| 6,075,908 A | * | 6/2000 | Paniccia et al. | 385/14 |
| 6,166,846 A | * | 12/2000 | Maloney | 359/247 |
| 6,215,577 B1 | * | 4/2001 | Koehl et al. | 359/261 |
| 6,269,199 B1 | * | 7/2001 | Maloney | 385/14 |

* cited by examiner

Primary Examiner—Rodney Bovernick
Assistant Examiner—Michael J. Stahl
(74) Attorney, Agent, or Firm—Blakley, Sokoloff, Taylor & Zafman LLP

(57) ABSTRACT

An optical modulator that modulates light through the back side of a flip chip packaged integrated circuit die. In one embodiment, an optical modulator includes a p-n junction having a side wall that is substantially vertical or perpendicular relative to a surface of the integrated circuit die. A charged region is generated at the p-n junction and is modulated in response to an electrical signal of the integrated circuit die. An optical beam is directed through the back side, of the semiconductor substrate and through the charged region along the side wall p-n junction. The optical beam is deflected off a deflector back through the charged region along the side wall back out the back side. In one embodiment, the side wall p-n junction is provided with a metal oxide semiconductor (MOS) gate structure. In another embodiment, the side wall p-n junction is provided by an n– (or p–) well in a p– (or n–) epitaxy layer of the semiconductor substrate. In one embodiment, the well is a well ring structure. In another embodiment, there are a plurality of wells periodically located in the epitaxy layer of the semiconductor substrate. In one embodiment, the well or plurality of wells are surrounded with an optical beam confinement structure.

30 Claims, 5 Drawing Sheets

METHOD AND APPARATUS FOR OPTICALLY MODULATING LIGHT THROUGH THE BACK SIDE OF AN INTEGRATED CIRCUIT DIE ALONG THE SIDE WALLS OF JUNCTIONS

RELATED APPLICATIONS

This application is a continuation-in-part application of application Ser. No. 08/993,786, filed Dec. 19, 1997, which issued as U.S. Pat. No. 6,075,908 on Jun. 13, 2000, entitled "Method and Apparatus For Optically Modulating Light Through The Back Side of an Integrated Circuit Die," and assigned to the Assignee of the present application.

BACKGROUND OF THE INVENTION

1. Field of the Invention

The present invention relates generally to integrated circuits and, more specifically, the present invention relates to the modulation of light using integrated circuits.

2. Background Information

Within the integrated circuit industry there is a continuing effort to increase integrated circuit speed as well as device density. One challenge that integrated circuit designers face with increasing circuit speeds and device densities is the increasingly significant propagation delays of circuit inputs and outputs due to the capacitive loading associated with off chip circuit connections. At slower clock speeds, the capacitive loading on integrated circuit lines is generally not a significant factor. However, as newer integrated circuit design clock speeds continue to climb towards the gigahertz range and beyond, it is evident that one of the major bottlenecks for future integrated circuits, such as for example but not limited to microprocessors, off chip caches, controllers, etc., will be the input/output bandwidth and/or round trip delay between and within chips.

Prior art attempts to address the capacitive loading problems associated with increased integrated circuit speeds and device densities have resulted in the use of larger and more powerful integrated circuit input/output drivers on the chip. Undesirable consequences of utilizing larger input/output drivers include the facts that the larger input/output drivers generally consume more power, create large di/dt noise, which requires low inductance packaging and large amount of on-die decoupling capacitance to provide a means of noise suppression, dissipate more heat and occupy more of valuable area on the integrated circuit die than smaller integrated circuit input/output drivers.

Other prior art attempts to overcome traditional integrated circuit interconnection limitations have included the use of optical interconnections. The prior art attempts at optical interconnections between integrated circuits have generally involved or have been based on two typical approaches.

One approach has been based on either using gallium arsenide (GaAs) laser diodes and modulating or switching the diodes electrically or by using GaAs built modulators that amplitude modulate a laser beam passing through the integrated circuit. The modulation is generally based on electroabsorption through strained multi-layer grown molecular beam epitaxy (MBE) films in GaAs integrated circuits. As can be appreciated to those skilled in the art, it is difficult and therefore impractical to integrate or combine III-V based technology, which includes GaAs, with standard silicon based metal oxide semiconductor (MOS) technology.

The second typical prior art approach is based on using silicon based optical waveguides. These waveguides are generally built using Silicon-on-Insulator (SOI) based processing techniques. Prior art SOI based modulators utilize silicon waveguide structures to switch light passing through the optical waveguide. The switching mechanism however utilizes injection of carriers into the waveguide rather like in a bipolar based transistor. One consequence of this is slow speed, for example up to several hundred megahertz, and very high power consumption, for example 10 mW or more for a single switch. In order to increase the modulation depth, one often tries to obtain a large interaction volume between the injected charge and the optical beam. This is generally accomplished by making very long waveguides, for example on order of thousands of microns, thereby increasing the interaction length through which the optical beam travels. As can be appreciated to those skilled in the art, actual incorporation of SOI waveguides into existing multi-layer standard MOS based processing however is not straight forward. Hence, utilization of these waveguide structures becomes quite impractical when used for high speed input/output in large transistor count microprocessors.

Acquiring electrical signals out of integrated circuits is also of great importance for testing integrated circuits. As the circuits get denser, as the size of transistors get smaller and as circuit speeds get faster, electrically probing the internal transistor nodes becomes more difficult, especially with flip chip bonding and other new packaging technologies.

SUMMARY OF THE INVENTION

An apparatus and method for modulating an optical beam are disclosed. In one embodiment, the optical modulator includes a first doped region disposed in a semiconductor substrate of an integrated circuit die. The semiconductor substrate has a front side and a back side. A first charged region is at a junction between a side wall of the first doped region and the semiconductor substrate. An optical beam is to be directed through the back side and through the first charged region through an optical path along the side wall of the first doped region. A deflector is disposed proximate to the first charged region. The deflector is to deflect the optical beam back through the first charged region along the optical path back out the back side. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

Figure 1:
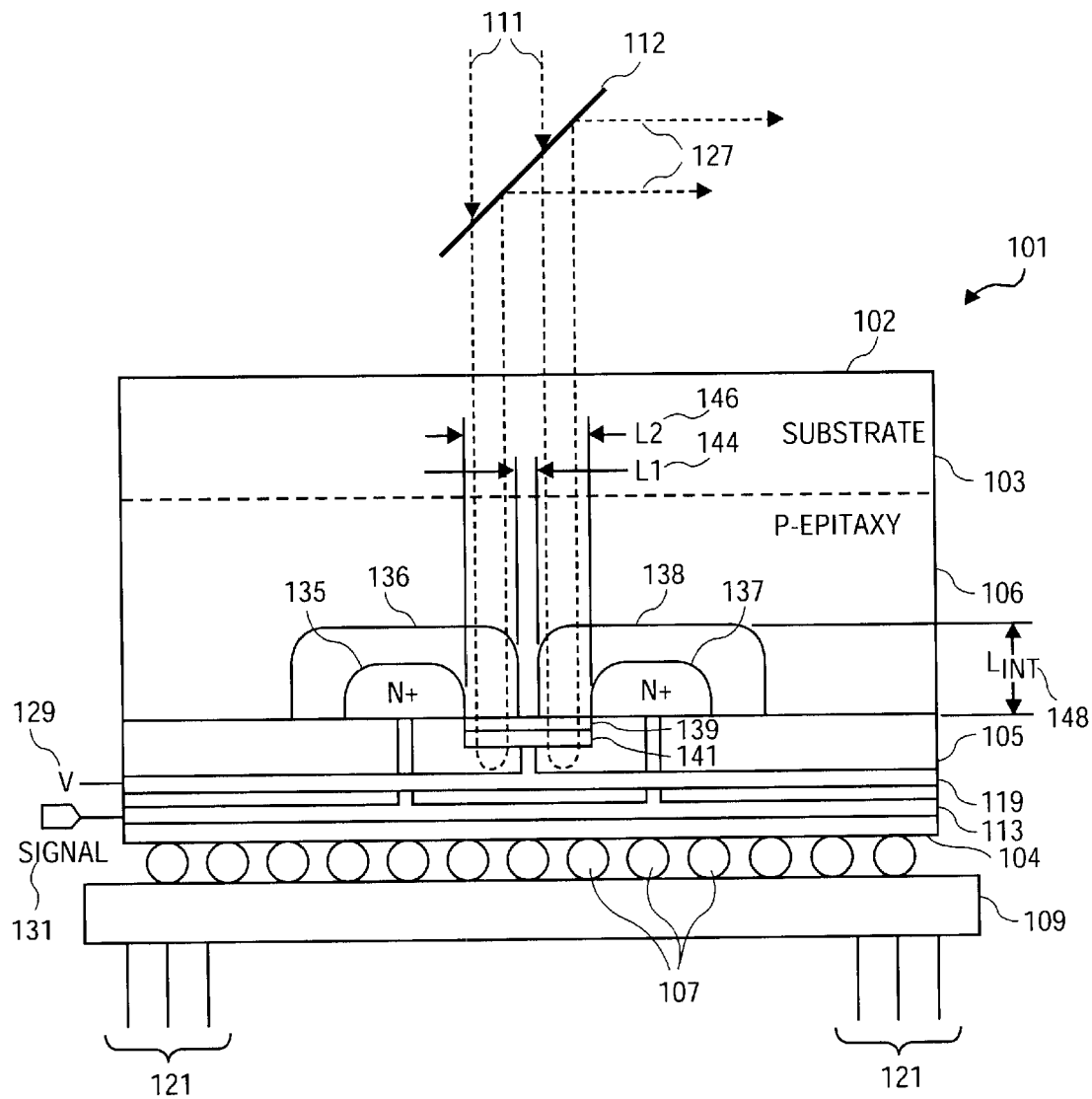
FIG. 1 is an illustration of a cross section of one embodiment of a flip chip packaged integrated circuit die including an optical modulator having a metal oxide semiconductor gate structure in accordance with the teachings of the present invention.

A method and an apparatus providing an optical modulator is disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

The present invention provides an optical modulator that enables integrated circuit signals to be extracted optically from integrated circuit output circuit nodes through the back side of the semiconductor substrate of a integrated circuit die. In one embodiment, an optical modulator is disposed within a flip chip packaged integrated circuit die. In another embodiment, the optical modulator is not disposed within a flip chip packaged integrated circuit die.

In one embodiment, conventional devices may be used for optical input/output and testing through the back side of integrated circuit dice using either lateral p-n junctions or metal oxide semiconductor (MOS) gate structures having p-n junctions in the source/drain regions. In one embodiment, an optical beam is directed through the back side of a semiconductor substrate of an integrated circuit die. The optical beam is directed through a modulated charged region along the side wall of a p-n junction in the semiconductor substrate. The charged region changes in response to an electrical field. In one embodiment, the charge distribution of free charge carriers in the charged region is modulated in response to an electrical signal originating from, for example, an output node of a circuit in the integrated circuit die. In one embodiment, circuitry of the integrated circuit die is located towards the front side of the integrated circuit die. The optical beam is deflected back through the modulated charged region along the side wall of the p-n junction and back out through the back side of the semiconductor substrate of the integrated circuit die. The reflected light is modulated by an electrical signal of the integrated circuit die applied to the p-n junction or the MOS gate structure through some electro-optic effects, such as for example free-carrier absorption and/or refraction. This modulated light carrying electrical information may then be sent to a receiver where the optical signal is to be detected.

In one embodiment, charged regions of the optical modulator of the present invention may be part of a diffraction grating. In one embodiment, a diffraction grating includes a charged region proximate to an uncharged region. Thus, in one embodiment, the diffraction grating includes at least a single p-n junction or MOS gate structure proximate to an uncharged region. In another embodiment, the diffraction grating includes a one dimensional array of p-n junctions or MOS gate structures proximate to an uncharged region. In still another embodiment, the diffraction grating includes a two dimensional array of p-n junctions or MOS gate structures proximate to uncharged regions.

The diffracting property of the optical modulator is modulated in response to an integrated circuit signal. In one embodiment, the described optical modulator modulates the phase of a portion of the deflected optical beam in response to the applied signal. A resulting diffraction interference occurs between the phase modulated portions and non-phase modulated portions of the deflected optical beam. The interference of the two portions results in an amplitude modulation of the zeroth order and non-zeroth order diffractions of the deflected optical beam, from which the integrated circuit output signal can be extracted.

FIG. 1 is an illustration of a cross section of one embodiment of a flip chip packaged integrated circuit die 101 including an optical modulator having a MOS gate structure in accordance with the teachings of the present invention. In one embodiment, integrated circuit die 101 is a controlled collapse circuit connection (C4) or flip chip packaged integrated circuit die coupled to package substrate 109 through ball bonds 107. As can be appreciated by those skilled in the art, ball bonds 107 provide more direct connections between the internal integrated circuit nodes of integrated circuit die 101 and the pins 121 of package substrate 109, thereby reducing inductance problems associated with typical wire bond integrated circuit packaging technologies. In one embodiment, the internal integrated circuit nodes of integrated circuit die 101 are located towards the front side 104 of integrated circuit die 101. Another characteristic of flip chip packaging is that full access to a back side 102 of integrated circuit die 101 is provided. It is appreciated that in another embodiment, integrated circuit die 101 is not limited to being mounted in a flip chip packaged configuration.

In one embodiment, the optical modulator of the present invention includes a doped region 135 and a doped region 137, which are disposed in an epitaxy layer 106 of semiconductor substrate 103. A gate 141 in insulating layer 105 is separated by the gate insulator 139 from a channel region between doped regions 135 and 137. As can be appreciated, gate 141 and doped regions 135 and 137 are part of a MOS gate structure. Gate 141 is coupled to receive a signal 129 through conductor 119. Doped regions 135 and 137 are coupled together through conductor 113. In one embodiment, doped regions 135 and 137 are source/drain regions that can be toggled by the electrical signal 131 to create depletion layers that form charged regions 136 and 138. In one embodiment, the gate 141 is connected to a voltage V 129. In one embodiment, the existence of the gate 141 keeps the region between the two doped regions 135 and 137 free from shallow trench isolation, which would deflect the light and also reduce the side wall interaction, leading to high losses and low modulation efficiency.

In one embodiment, doped regions 135 and 137 are n+ doped silicon regions in a p− epitaxy layer 106 of silicon semiconductor substrate 103. In another embodiment, doped regions 135 and 137 are p+ doped silicon regions in an n− epitaxy layer 106 of silicon semiconductor substrate 103.

In one embodiment, signal 131 is a signal generated by an output node of an integrated circuit included within integrated circuit die 101. When a voltage of signal 131 is varied on conductor 113, the free charge carrier distribution in charged regions 136 and 138 is modulated. It is noted that for purposes of this disclosure, a "charged" region may be interpreted as a highly charged region having free charge carriers, which can be modulated in response to an electrical signal.

In another embodiment, gate 141 is electrically addressable and is coupled to receive signal 131 whereas the source and drain are connected to a voltage 129. In this embodiment, the charged regions are proximate to the two side walls of doped regions 135 and 137 proximate to the gate 141 as well as the gate channel above the gate insulator 139. The free charge distribution in charged regions is modulated in response to signal 131.

In one embodiment, an optical beam 111 is directed through back side 102 into semiconductor substrate 103 and is directed through charged regions 136 and 138 along the side walls of doped regions 135 and 137, respectively. It is appreciated that in one embodiment these side walls are formed by p-n junctions that are parallel relative to the device surface (e.g. the back side 102 surface).

Optical beam 111 is deflected from a deflector proximate to charged regions 136 and 138. In one embodiment, the deflector is formed with conductor 119 in insulating layer 105. As shown, the optical beam is deflected back through charged regions 136 and 138 along the side walls of doped regions 135 and 137, respectively, back out the back side 102 of semiconductor substrate 103. In one embodiment, optics 112 may be used to direct optical beam 111 into the back side 102 and direct a modulated deflected optical beam 127 into a receiver (not shown) to detect the optical signal.

In one embodiment, semiconductor substrate 103 includes silicon and optical beam 111 includes infrared or near infrared laser light. As known to those skilled in the art, silicon is partially transparent to infrared or near infrared light. In one embodiment, conductor 119 is a metal layer disposed in an insulating layer 105 of integrated circuit die 101.

In one embodiment, the phase of optical beam 111 passing through charged regions 136 and 138 is modulated due to the plasma optical effect. The plasma optical effect arises due to an interaction between the optical electric field vector and free charge carriers that may be present along the propagation path of the optical beam 111. The electric field of the optical beam 111 polarizes the free charge carriers and this effectively perturbs the local dielectric constant of the medium. This in turn leads to a perturbation of the propagation velocity of the optical wave and hence the refractive index for the light, since the refractive index is simply the ratio of the speed of the light in vacuum to that in the medium. The free charge carriers also lead to absorption of the optical field as optical energy is used up, to accelerate the free charge carriers. Generally the refractive index perturbation is a complex number with the real part being that part which causes the velocity change and the imaginary part being related to the free charge carrier absorption. The amount of phase shift φ is given by $$\phi = (2\pi/\lambda)\Delta nL \qquad \text{(Equation 1)}$$

with the optical wavelength λ and the interaction length L. In the case of the plasma optical effect in silicon, the refractive index change Δn due to the electron ($\Delta N_e$) and hole ($\Delta N_h$) concentration change is given by:

$$\Delta n = -\frac{e^2\lambda^2}{8\pi^2 c^2 \varepsilon_0 n_0}\left(\frac{b_e(\Delta N_e)^{1.05}}{m_e^*} + \frac{b_h(\Delta N_h)^{0.8}}{m_h^*}\right) \qquad \text{(Equation 2)}$$

where $n_o$ is the nominal index of refraction for silicon, e is the electronic charge, c is the speed of light, $\epsilon_o$ is the permittivity of free space, $m_e^*$ and $m_h^*$ are the electron and hole effective masses, respectively, $b_e$ and $b_h$ are fitting parameters. As a result of the phase shifting due to the plasma optical effect, the integrated circuit signal 129 may be extracted from the integrated circuit through modulated optical beam 127.

As can be seen from Equation 1, the amount of phase shift φ of optical beam 111 can be increased by increasing the interaction length L. In the embodiment illustrated in FIG. 1, the interaction length L of charged regions 136 and/or 138 is represented by $L_{INT}$ 148. In one embodiment, the interaction length is effectively doubled since optical beam 111 is deflected and therefore passes through charged regions 136 and/or 138 twice. It is also appreciated that since the optical path of optical beam 111 is along the side walls of doped regions 135 and 137, a strongly increased interaction length L is provided when compared to the thickness of charged regions 136 and 138 as well as the depletion or accumulation layer of a MOS gate (not shown) at for example locations not along the side walls of doped regions 135 and 137.

As illustrated in the embodiment shown in FIG. 1, charged regions 136 and 138 extend toward each other in epitaxy layer 106 of the semiconductor substrate 103 away from the respective side walls of doped regions 135 and 137, respectively. In one embodiment charged region 136 overlaps or nearly overlaps charged region 138 in the semiconductor substrate space between doped region 135 and doped region 137. For purposes of this disclosure, "nearly overlaps" in this context may be interpreted as charged regions 136 and 138 occupying for example 60 percent of the semiconductor substrate space L2 146 between the side walls of doped regions 135 and 137. That is for example, the ratio of the distance L1 144 between doped regions 135 and 137 compared to the distance L2 146 between the side walls of doped regions 135 and 137 in one example is less than 40 percent. In one embodiment, the thickness of charged regions in 136 and 138 may be adjusted in the semiconductor process by adjusting accordingly the doping concentrations of doped regions 135 and 137 relative to the doping concentration of epitaxy layer 106. In one embodiment, the doping concentration of doped regions 135 and 137 are higher than the doping concentration of epitaxy layer 106. In one embodiment, doped regions have a doping concentration on the order of $10^{19}$ charge carriers per cubic centimeter.

In one embodiment it is appreciated that reflective structures, such as for example conductors 119 or 113 in insulating layer 105 extend beyond charged regions 136 and 138. As a result, another optical beam (not shown) or optical beam 111 with a large spot size may be deflected off of conductor 119 or conductor 113 through uncharged regions to provide an unmodulated reference beam for building an interferometer. As can be appreciated to those skilled in the art, an interferometer converts phase modulation in an optical beam into amplitude modulation.

Figure 2:
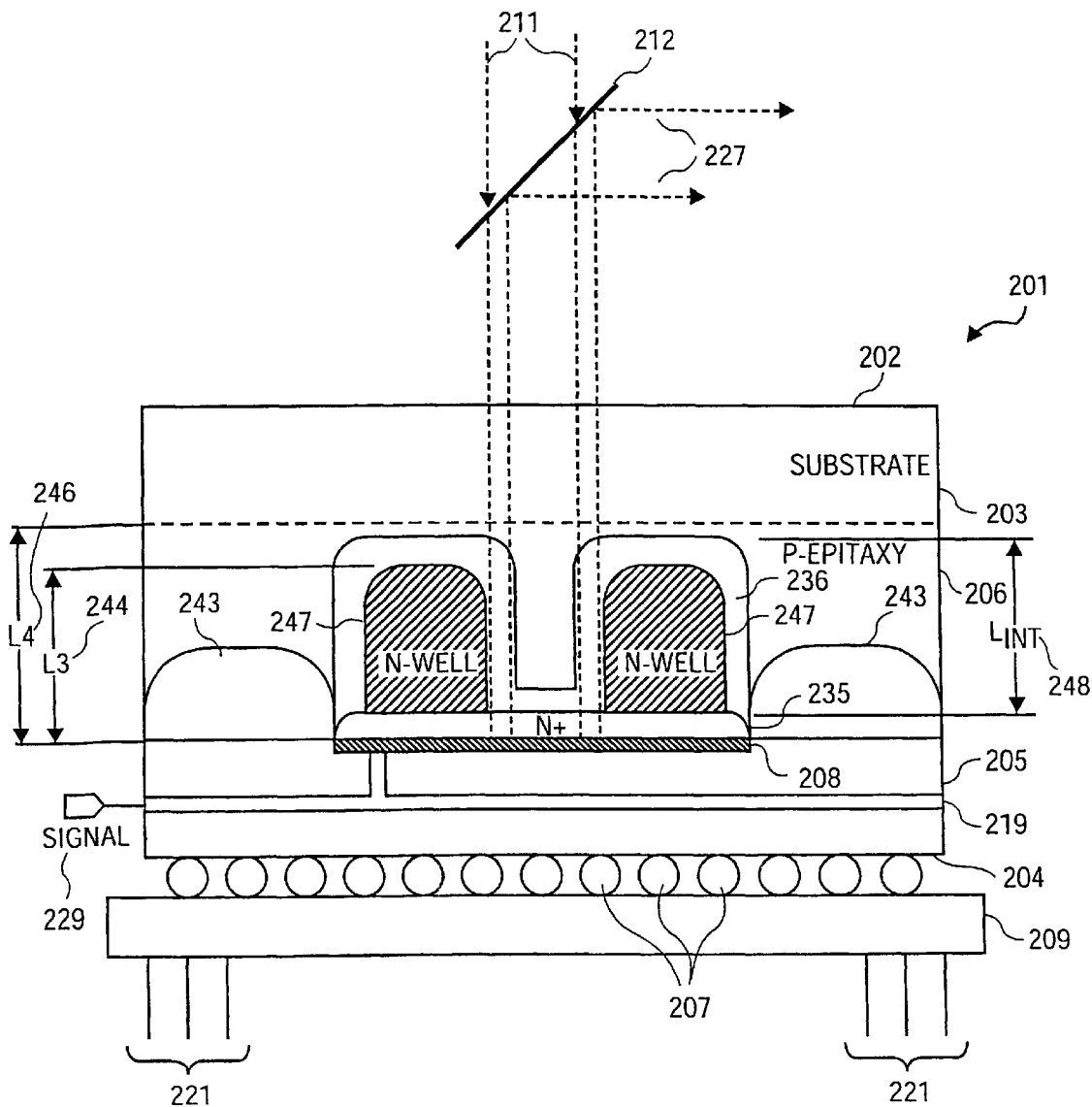
FIG. 2 is an illustration of a cross section of another embodiment of a flip chip packaged integrated circuit die including an optical modulator having a well ring structure in accordance with the teachings of the present invention.

FIG. 2 is an illustration of a cross section of another embodiment of a flip chip packaged integrated circuit die 201 including an optical modulator in accordance with the teachings of the present invention. Similar to the integrated circuit die 101 of FIG. 1, integrated circuit die 201 is illustrated in a flip chip configuration and is coupled to package substrate 209 through ball bonds 207 to provide more direct connections between the internal integrated circuit nodes of integrated circuit die 201 and the pins 221 of package substrate 209. In one embodiment, the internal integrated circuit nodes of integrated circuit die 201 are located towards the front side 204 of integrated circuit die 201. It is appreciated that in another embodiment, integrated circuit die 201 is not limited to being mounted in a flip chip packaged configuration in accordance with the teachings of the present invention.

Similar to the integrated circuit die 101, the optical modulator in integrated circuit die 201 of FIG. 2 includes a charged region 236 disposed within an epitaxy layer 206 the semiconductor substrate 203. In one embodiment, charged region 236 is provided using a p-n junction formed with doped region 247 in epitaxy layer 206 of semiconductor substrate 203.

In one embodiment, doped region 247 is an n− well region that is electrically addressable and switchable. In one embodiment, doped region 247 is an n− well ring structure having an inside side wall and an outside side wall. (See FIG. 3 for a layout view of integrated circuit die 201.) It is appreciated that in one embodiment, these side walls are formed by p-n junctions that are parallel relative to the device surface (e.g. the back side 202 surface). In one embodiment, doped region 247 is an n− doped silicon well region in a p− epitaxy layer 206 of a silicon semiconductor substrate 203. In another embodiment, doped region 213 is a p− doped silicon well region in an n− type epitaxy layer of a silicon semiconductor substrate 203.

In one embodiment, charged region 236 is generated with the p-n junction biased in depletion mode for fast response. In another embodiment, charged region 236 could be generated with the p-n junction forward biased. In this case, the high injected current density together with the long interaction length provided along the side walls of doped region 247 provide large modulation, which is exponentially proportional to the injection current. It is appreciated that in other embodiments, side wall junctions of bipolar transistors such as for example a base-collector junction can be utilized in accordance with the teachings of the present invention.

In one embodiment, the free charge distribution in charged region 236 is modulated in response to signal 229, which is carried by conductor 219 in insulating layer 205 to doped region 247. In one embodiment, signal 229 is a signal generated by an output node of an integrated circuit included within integrated circuit die 201.

In one embodiment, doped region 247 is coupled to a higher doped region 235 proximate to insulating layer 205. In one embodiment, the higher doped region 235 is an n+ cap doped region, which is coupled to receive signal 229 through conductor 219. Similar to the gate in FIG. 1, the existence of the n+ cap 235 in one embodiment keeps the region between the two doped regions 247 free from shallow trench isolation, which would deflect the light and also reduce the side wall interaction, leading to high losses and low modulation efficiency. In one embodiment, a reflective layer 208 including silicide is disposed in the insulating layer 205 proximate to be higher doped region 235. In one embodiment, the silicide of reflective layer 208 acts as a conductor between conductor 219 and doped region 235. In one embodiment, contact is made between conductor 219 and reflective layer 208 at an end or edge of reflective layer 208 such that there is a smooth reflector proximate to the side wall junctions near charged region 236. In one embodiment, higher doped region 235 has a doping concentration that is higher than the doping concentration of the doped region 247. In one embodiment, higher doped region has a doping concentration on the order of $10^{19}$ charge carriers per cubic centimeter and doped region 247 has a doping concentration on the order of $10^{18}$ charge carriers per cubic centimeter.

As shown in the embodiment illustrated in FIG. 2, reflective layer 208 reflects an optical beam 211, which is directed through the back side 202 through charged region 236 along the inside side wall of doped region 247. The optical beam 211 is deflected back through the charged region 236 along the inside side wall of doped region 247 back out the back side 202 of semiconductor substrate 203. In one embodiment, optics 212 may be used to direct optical beam 211 into the back side 202 and direct a modulated deflected optical beam 227 into a receiver (not shown) to detect the optical signal.

As mentioned above, doped region 247 in one embodiment is an n− well region disposed in a p− epitaxy layer. In one embodiment, the well region of doped region 247 is nearly as deep in the semiconductor substrate 203 as the epitaxy layer 206. As a result, the interaction length of charged region 236 along the side wall of doped region 247 is nearly as long as the depth of epitaxy layer 206. As discussed above, the amount of phase shift φ of optical beam 211 can be increased by increasing the interaction length L according to Equation 1. In the embodiment illustrated in FIG. 2, the interaction length L of charged regions 236 is represented by $L_{INT}$ 248. In one embodiment, the interaction length is effectively doubled since optical beam 211 is deflected and therefore passes through charged region 236 twice. It is also appreciated that since the optical path of optical beam 211 is along a side wall of doped region 247, an increased interaction length L is provided when compared to the thickness of charged region 236 at for example locations not along the side walls of doped regions 247.

As mentioned above, in one embodiment, the depth of doped region 247 is nearly equal to the depth of epitaxy layer 206. For purposes of this disclosure, "nearly" in this context may be interpreted as doped region 247 having depth L3 244 of, for example, 50 percent or more of the depth L4 246 of the epitaxy layer 206. In one embodiment, this interaction length is at least one order of magnitude longer than the thickness of a pn junctions (e.g. pn junctions of integrated circuit die 201 transistors, diodes, etc.) at locations other than the side walls of doped region 247. By increasing the proportion of the depth of the well region of doped region 247 to epitaxy layer 206, the interaction length L of charged region 236 is increased, thereby increasing the phase shift of optical beam 211.

In one embodiment, integrated circuit die 201 also includes an optical beam confinement structure 243 surrounding the well ring structure formed by doped region 247. In one embodiment, the optical beam confinement structure 243 includes a shallow trench isolation region disposed in the epitaxy layer 206 of semiconductor substrate 203. In one embodiment, the shallow trench isolation region includes an insulating structure having curved walls that confine optical beam 211 to doped region 247 and the inside of the well ring structure formed by doped region 247. In one embodiment, the curved walls of optical beam confinement structure 243 deflect incident light due to total internal reflection.

In one embodiment, is appreciated that reflective structures, such as for example conductor 219 in insulating layer 205 extend beyond optical beam confinement structure 243. As a result, another optical beam (not shown) or optical beam 211 with a large spot size may be deflected off of conductor 219 through uncharged regions to provide an unmodulated reference beam for building an interferometer. As can be appreciated to those skilled in the art, an interferometer converts phase modulation in an optical beam into amplitude modulation.

Figure 3:
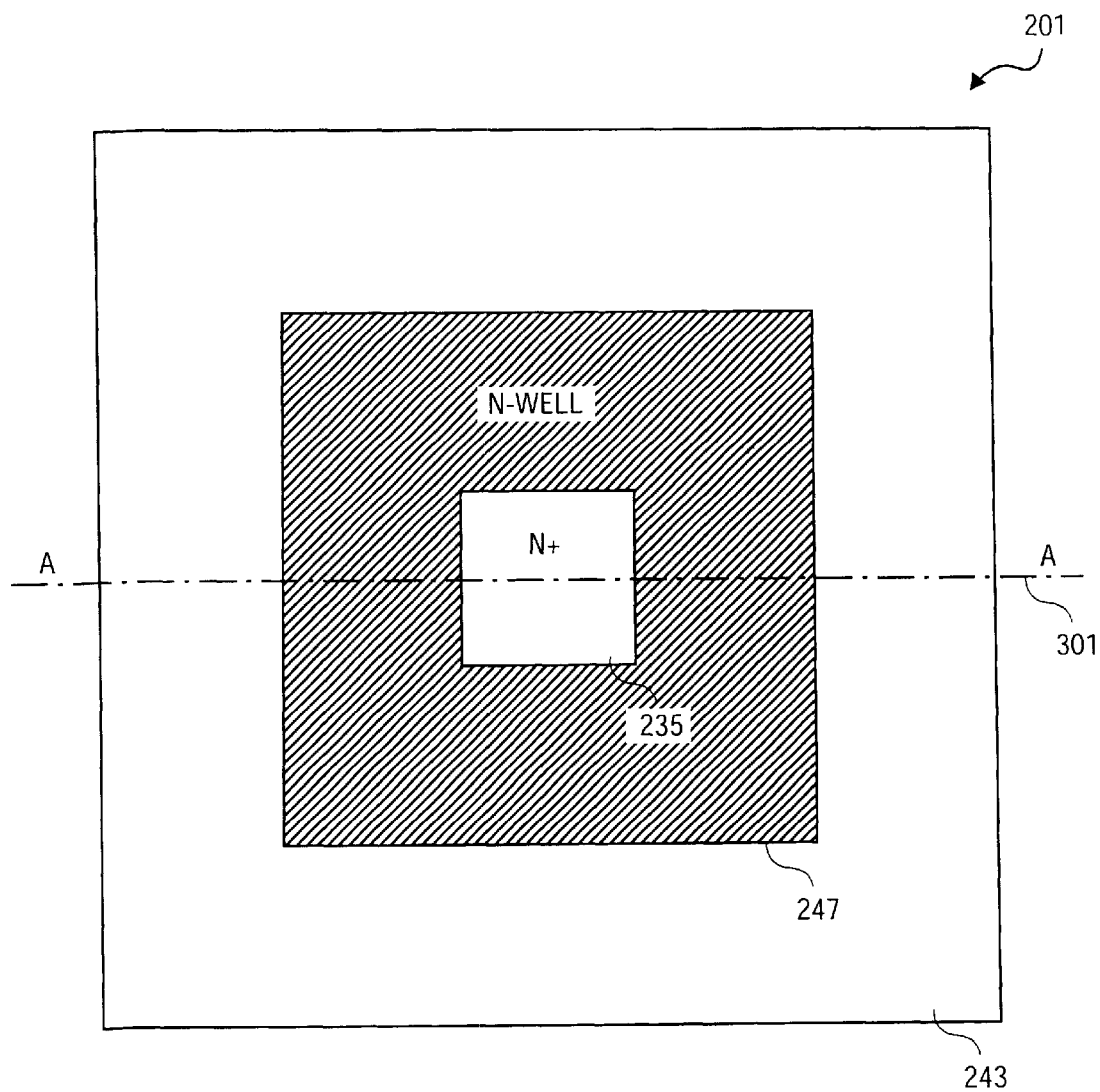
FIG. 3 is an illustration of layout view of an embodiment of a flip chip packaged integrated circuit die including an optical modulator having a well ring structure in accordance with the teachings of the present invention.

FIG. 3 is an illustration of layout view of integrated circuit die 201 of FIG. 2. FIG. 3 shows integrated circuit die 201 with the cross-section illustration of FIG. 2 being along line A—A 301 of FIG. 3. As shown in FIG. 3, a ring structure is formed with optical beam confinement structure 243. An n-well ring structure formed by doped region 247 is surrounded by the optical beam confinement structure 243. As can be seen within the inside side wall of doped region 247, an n+ cap higher doped region 235 covers the whole area including the n-well.

Figure 4:
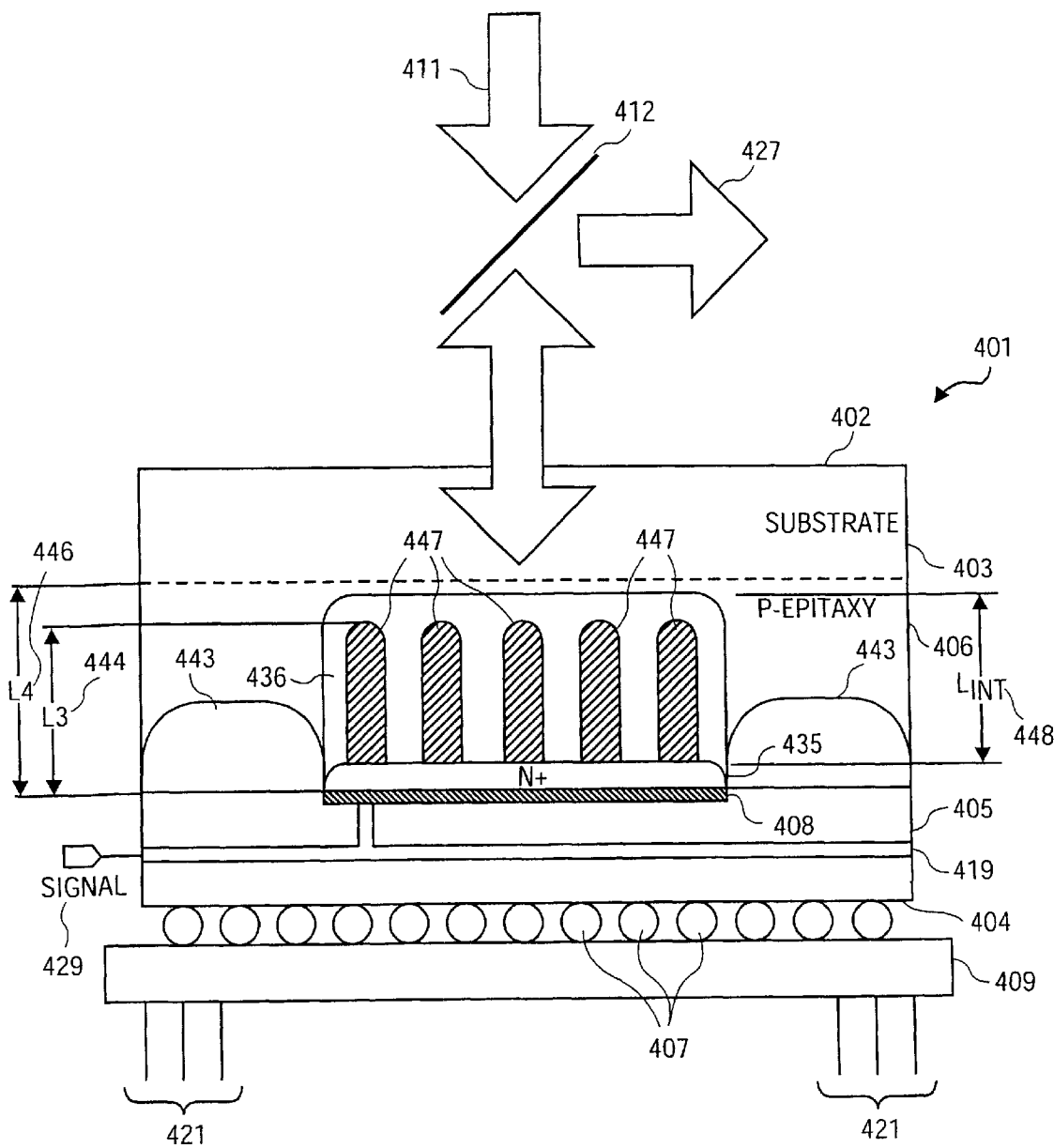
FIG. 4 is an illustration of a cross section of yet another embodiment of a flip chip packaged integrated circuit die including an optical modulator having a plurality of wells in accordance with the teachings of the present invention.

FIG. 4 is an illustration of a cross section of another embodiment of a flip chip packaged integrated circuit die 401 including an optical modulator in accordance with the teachings of the present invention. Similar to the integrated circuit die 101 of FIG. 1 and integrated circuit die 201 of FIGS. 2 and 3, integrated circuit die 401 is illustrated in a flip chip configuration and is coupled to package substrate 409 through ball bonds 407 to provide more direct connections between the internal integrated circuit nodes of integrated circuit die 401 and the pins 421 of package substrate 409. In one embodiment, the internal integrated circuit nodes of integrated circuit die 401 are located towards the front side 404 of integrated circuit die 401. It is appreciated that in another embodiment, integrated circuit die 401 is not limited to being mounted in a flip chip packaged configuration in accordance with the teachings of the present invention.

Similar to the integrated circuit dice 101 and 201, the optical modulator in integrated circuit die 401 of FIG. 4 includes a charged region 436 disposed within an epitaxy layer 406 the semiconductor substrate 403. In one embodiment, charged region 436 is provided using a plurality p-n junctions formed with a plurality of doped regions 447 in epitaxy layer 406 of semiconductor substrate 403. In one embodiment, the plurality of doped regions 447 are arranged periodically in stripes, squares or the like in one or two dimensional gratings. In one embodiment, the plurality of doped regions 447 are n– well regions that are electrically addressable and switchable. In one embodiment, the plurality of doped regions 447 are n– wells that have side walls. It is appreciated that in one embodiment these side walls are formed by p-n junctions that are parallel relative to the device surface (e.g. the back side 402 surface).

In one embodiment, the plurality of doped regions 447 are n– doped silicon regions in a p– epitaxy layer 406 of a silicon semiconductor substrate 403. In another embodiment, doped region 413 is a p– doped silicon region in an n– type epitaxy layer 406 of a silicon semiconductor substrate 403. In one embodiment, the free charge distribution in charged region 436 is modulated in response to signal 429, which is carried by conductor 419 in insulating layer 405 to the plurality of doped regions 447. In one embodiment, signal 429 is a signal generated by an output node of an integrated circuit included within integrated circuit die 401.

In one embodiment, the plurality of doped regions 447 are coupled to a higher doped region 435 proximate to insulating layer 405. In one embodiment, the higher doped region 435 is an n+ cap doped region, which is coupled to receive signal 429 through conductor 419. In one embodiment, a reflective layer 408 including silicide is disposed in the insulating layer 405 proximate to the higher doped region 435. In one embodiment, the silicide of reflective layer 408 acts as a conductor between conductor 419 and doped region 435. In one embodiment, contact is made between conductor 419 and reflective layer 408 at an end or edge of reflective layer 408 such that there is a smooth reflector proximate to the side wall junctions near charged region 436.

In one embodiment, higher doped region 435 has a doping concentration that is higher that the doping concentration of the doped region 447. In one embodiment, higher doped region has a doping concentration on the order $10^{19}$ charge carriers per cubic centimeter and doped region 447 has a doping concentration on the order of $10^{18}$ charge carriers per cubic centimeter.

As shown in the embodiment illustrated in FIG. 4, reflective layer 408 reflects an optical beam 411, which is directed through the back side 402 through charged region 436 along the side walls of the plurality of doped regions 447. The optical beam 411 is deflected back through the charged region 436 along the side walls of the plurality of doped regions 447 back out the back side 402 of semiconductor substrate 403. In one embodiment, optics 412 may be used to direct optical beam 411 into the back side 402 and direct a modulated deflected optical beam 427 into a receiver (not shown) to detect the optical signal.

As mentioned above, the plurality of doped regions 447 in one embodiment are n-well regions disposed in a p– epitaxy layer. In one embodiment, the well regions of doped regions 247 are nearly as deep in the semiconductor substrate 403 as the epitaxy layer 406. As a result, the interaction length L of charged region 436 along the side walls of doped regions 447 is nearly as long as the depth of epitaxy layer 406. As discussed above, the amount of phase shift φ of optical beam 411 can be increased by increasing the interaction length L according to Equation 1. In the embodiment illustrated in FIG. 4, the interaction length L of charged regions 436 is represented by $L_{INT}$ 448. In one embodiment, the interaction length is effectively doubled since optical beam 411 is deflected and therefore passes through charged region 436 twice. It is also appreciated that since the optical path of optical beam 411 is along the side walls of the plurality of doped regions 447, an increased interaction length L is provided when compared to the thickness of charged region 436 at for example locations not along the side walls of doped regions 447.

As mentioned above, in one embodiment, the depth of the plurality of doped region 447 is nearly equal to the depth of epitaxy layer 406. In one embodiment, a distance L3 444 representing the depth of plurality of doped regions 447 can be for example 50 percent or more relative to a distance L4 446 representing the depth of the epitaxy layer 406.

Similar to integrated circuit die 201 above, integrated circuit die 401 also includes an optical beam confinement structure 443 surrounding the plurality of doped regions 447. In one embodiment, the optical beam confinement structure 443 includes a shallow trench isolation region disposed in the epitaxy layer 406 of semiconductor substrate 403. In one embodiment, the shallow trench isolation region includes an insulating structure having curved walls that confine optical beam 411 to the region surrounding the plurality of doped regions 447. In one embodiment, the curved walls of optical beam confinement structure 443 deflect incident light due to total internal reflection.

In one embodiment, it is appreciated that reflective structures, such as for example conductor 419 in insulating layer 405, extend beyond optical beam confinement structure 443. As a result, another optical beam (not shown) or optical beam 411 with a large spot size may be deflected off of conductor 419 through uncharged regions to provide an unmodulated reference beam for building an interferometer. As can be appreciated to those skilled in the art, an interferometer converts phase modulation in an optical beam into amplitude modulation.

Figure 5:
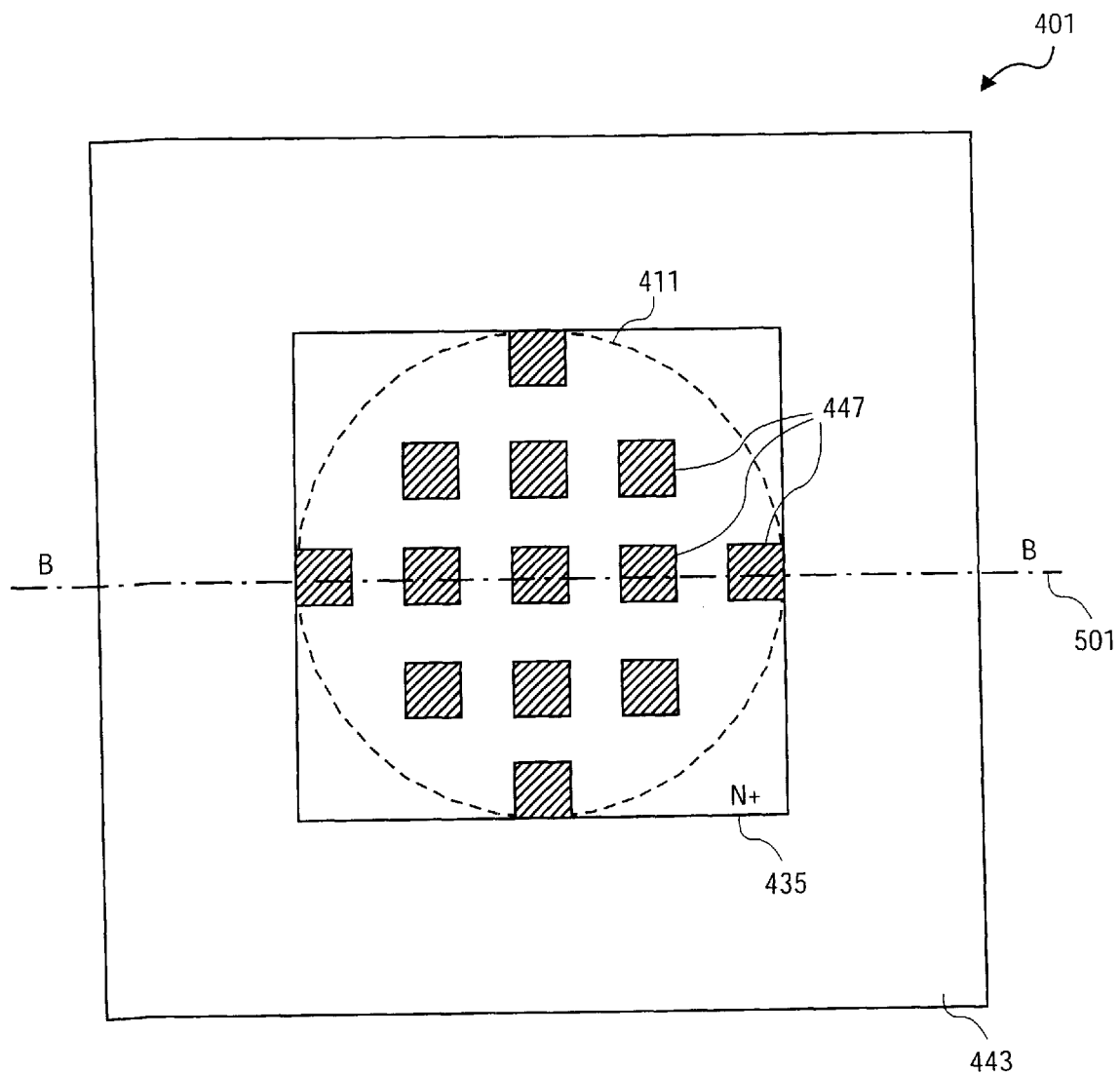
FIG. 5 is an illustration of layout view of an embodiment of a flip chip packaged integrated circuit die including an optical modulator having a plurality of wells in accordance with the teachings of the present invention.

FIG. 5 is an illustration of layout view of integrated circuit die 401 of FIG. 4. FIG. 5 shows integrated circuit die 401 with the cross-section illustration of FIG. 4 being along line B—B 501 of FIG. 5. As shown in FIG. 5, a ring structure is formed with optical beam confinement structure 443. The spot size of optical beam 411 is illustrated inside optical beam confinement structure 443. The plurality of n-well structures formed by doped regions 447 are illustrated over n+ cap higher doped region 435 within the inside of the optical beam confinement structure 443. In another embodiment, the plurality of n-well structures may be used as a cluster to build a one- or two-dimensional grating. The grating acts as an internal interferometer, which converts phase modulation of an optical beam into amplitude modulation without the need of an extra reference beam.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An optical modulator, comprising:
   a first doped region disposed in a semiconductor substrate of an integrated circuit die, the semiconductor substrate having a front side and a back side;
   a first charged region at a junction between a side wall of the first doped region and the semiconductor substrate, an optical beam to be directed through the back side and through the first charged region through an optical path along the side wall of the first doped region; and
   a deflector disposed proximate to the first charged region, the deflector to deflect the optical beam back through the first charged region along the optical path back out the back side.

2. The optical modulator of claim 1 wherein the charged region comprises a depletion region layer extending from the first doped region.

3. The optical modulator of claim 1 further comprising:
   a second doped region disposed in the semiconductor substrate of the integrated circuit die; and
   a second charged region at a junction between a side wall of the second doped region and the semiconductor substrate, the side wall of the second doped region opposite the side wall of the first doped region, the second charged region to extend towards and overlap or nearly overlap the first charged region, the optical beam passing through the second charged region through the optical path, the optical path along the side walls of the first and second doped regions.

4. The optical modulator of claim 3 wherein the semiconductor substrate between the side walls of the first and second doped regions is substantially occupied by the first and second charged regions.

5. The optical modulator of claim 3 wherein the first and second doped regions are source/drain regions of a metal oxide semiconductor (MOS) gate structure, a charge density of the first and second charged regions modulated in response to a signal of the integrated circuit die coupled to the MOS gate structure.

6. The optical modulator of claim 1 wherein the semiconductor substrate comprises an epitaxy layer, the first doped region disposed within the epitaxy layer of the semiconductor substrate.

7. The optical modulator of claim 6 wherein the first doped region is a well region disposed in the epitaxy layer of the semiconductor substrate, the well region having a depth nearly as deep as a depth of the epitaxy layer.

8. The optical modulator of claim 7 further comprising a third doped region disposed in the epitaxy layer proximate to the first doped region, the third doped region having a doping concentration greater than a doping concentration of the first doped region, the third doped region coupled to the first doped region such that the first charged region extends into the epitaxy layer from the first and third doped regions.

9. The optical modulator of claim 8 wherein a charge density of the first charged region is modulated in response to a signal of the integrated circuit die coupled to the first and third doped regions.

10. The optical modulator of claim 8 wherein the deflector comprises a reflective material disposed in an insulator layer of the integrated circuit die proximate to the third doped region.

11. The optical modulator of claim 7 wherein the well region is a well ring structure disposed within the epitaxy layer of the semiconductor substrate, wherein the side wall of the first doped region includes an inside wall of the well ring structure.

12. The optical modulator of claim 11 further comprising a optical beam confinement structure disposed within the epitaxy layer of the semiconductor substrate, the optical beam confinement structure surrounding the well ring structure within the epitaxy layer of the semiconductor substrate.

13. The optical modulator of claim 12 wherein the optical beam confinement structure comprises an isolation oxide disposed within the epitaxy layer of the semiconductor substrate.

14. The optical modulator of claim 7 wherein the well region is one of a plurality of well regions disposed in the epitaxy layer of the semiconductor substrate, each one of the plurality of well regions having a side wall, the first charged region extending from each one of the side walls such that the optical beam is directed through the first charged region along each one of the side walls.

15. The optical modulator of claim 14 wherein the epitaxy layer between the side walls of each one of the plurality of doped regions is substantially occupied by the first charged region.

16. The optical modulator of claim 14 wherein a charge density of the first charged region is modulated in response to a signal of the integrated circuit die coupled to each one of the plurality of well regions.

17. The optical modulator of claim 14 further comprising a optical beam confinement structure disposed within the epitaxy layer of the semiconductor substrate, the optical beam confinement structure having a ring structure surrounding each one of the plurality of the well regions within the epitaxy layer of the semiconductor substrate.

18. A method of modulating an optical beam, comprising:
    directing an optical beam through a back side of a semiconductor substrate of an integrated circuit die having a front side and the back side, the optical beam directed through a first charged region extending from a side wall of a first doped region disposed within the semiconductor substrate, the optical beam directed through a path through the first charged region along the side wall of the first doped region;
    deflecting the optical beam back through the path through the first charged region back out the back side; and
    modulating a charge density of the first charged region in response to a signal of the integrated circuit die.

19. The method of modulating the optical beam of claim 18, further comprising:
    directing the optical beam through a second charged region extending from a side wall of a second doped region disposed within the semiconductor substrate, the second charged region extending toward and overlapping or nearly overlapping the first charged region such that the path through the first charged region includes the second charged region along the side wall of the second doped region, wherein the semiconductor substrate between the first and second doped regions is substantially occupied by the first and second charged regions; and modulating a charge density of the second charged region in response to the signal of the integrated circuit die.

20. The method of modulating the optical beam of claim 18 wherein deflecting the optical beam comprises deflecting the optical beam off a reflective material disposed within an insulating layer of the integrated circuit die.

21. The method of modulating the optical beam of claim 18 further comprising forming the first charged region inside a well ring structure disposed within the semiconductor substrate, wherein the first doped region is formed by the well ring structure, the side wall of the first doped region inside the well ring structure.

22. The method of modulating the optical beam of claim 21 further comprising confining the optical beam to pass through the well ring structure with an optical beam confinement structure disposed within the semiconductor substrate.

23. The method of modulating the optical beam of claim 18 wherein modulating the charge density of the first charged region in response to the signal includes coupling the first doped region to a higher doped region coupled to receive the signal, the higher doped region having a higher doping concentration that a doping concentration of the first doped region.

24. The method of modulating the optical beam of claim 18 wherein the first doped region is disposed in an epitaxy layer of the semiconductor substrate, the first doped region having a depth in the epitaxy layer nearly equal to a depth of the epitaxy layer.

25. The method of modulating the optical beam of claim 18 wherein the first doped region is one of a plurality of doped regions coupled to receive the signal, each one of the doped region having a side wall, the first charged region to occupy the semiconductor substrate between the side walls of each of the plurality of doped regions.

26. An optical modulator, comprising:
   a semiconductor substrate of an integrated circuit die, the semiconductor substrate having including a front side and a back side;
   a doped region disposed in the semiconductor substrate;
   a charged region proximate to a side wall of the doped region at a junction between the doped region and the semiconductor substrate, a charge density of the charged region to be modulated in response to a signal of the integrated circuit die; and
   a deflector proximate to the doped region such that an optical beam is to be directed through the back side of the semiconductor substrate through the charged region along the side wall of the doped region to the deflector, the deflector to deflect the optical beam back through the charged region along the side wall of the doped region back through the back side of the semiconductor substrate.

27. The optical modulator of claim 26 further comprising:
   another doped region disposed in the semiconductor substrate; and
   another charged region proximate to a side wall of the other doped region at a junction between the other doped region and the semiconductor substrate, a charge density of the other charged region to be modulated in response to the signal of the integrated circuit die, the other charged region extending toward the charged region such that the charged region overlaps or nearly overlaps the other charged region.

28. The optical modulator of claim 26 further comprising an epitaxy layer in the semiconductor substrate, the doped region disposed in the epitaxy layer, the doped region having a depth nearly equal to a depth of the epitaxy layer.

29. The optical modulator of claim 28 wherein the doped region is one of a plurality of doped regions, the charged region occupying the epitaxy layer between each one of the plurality of doped regions.

30. The optical modulator of claim 28 wherein the doped region is a well ring structure disposed in the epitaxy layer of the semiconductor substrate, the side wall including an inside wall of the well ring structure.

* * * * *